(12) United States Patent
Bryan

(10) Patent No.: US 6,524,028 B2
(45) Date of Patent: Feb. 25, 2003

(54) FISH SAFE SCREENED WATER DIVERSION APPARATUS

(75) Inventor: William Jerry Bryan, Hood River, OR (US)

(73) Assignee: Farmers Irrigation District, Hood River, OR (US)

( * ) Notice: Subject to any disclaimer, the term of this patent is extended or adjusted under 35 U.S.C. 154(b) by 0 days.

(21) Appl. No.: 09/801,514

(22) Filed: Mar. 7, 2001

(65) Prior Publication Data

US 2002/0127060 A1 Sep. 12, 2002

(51) Int. Cl.[7] ................................................ E02B 8/08
(52) U.S. Cl. ............................ 405/81; 405/80; 405/83; 405/127; 210/154; 210/164
(58) Field of Search ............................... 405/80, 81, 82, 405/83, 84, 77, 107, 124, 126; 210/154, 155, 162, 163, 164, 165, 170; 119/219

(56) References Cited

U.S. PATENT DOCUMENTS

| | | | |
|---|---|---|---|
| 2,826,897 A | * 3/1958 | Vinsonhaler et al. | ... 119/219 X |
| 3,377,805 A | * 4/1968 | Warner | ......... 405/81 |
| 3,938,340 A | 2/1976 | Downs | |
| 4,064,048 A | 12/1977 | Downs et al. | |
| 4,222,866 A | * 9/1980 | Wilson | ......... 209/417 |
| 4,260,286 A | 4/1981 | Buchanan | |
| 4,437,431 A | * 3/1984 | Koch | ......... 405/81 X |
| 4,488,835 A | * 12/1984 | Eicher | ......... 405/83 |
| 4,526,494 A | 7/1985 | Eicher | |
| 4,629,361 A | * 12/1986 | Zimmerman | ......... 405/83 |
| 4,740,105 A | 4/1988 | Wollander | |
| 4,907,381 A | * 3/1990 | Earler | ......... 52/12 |
| 5,109,640 A | * 5/1992 | Creson | ......... 210/474 X |
| 5,161,913 A | * 11/1992 | Boylan | ......... 405/83 |
| 5,263,833 A | * 11/1993 | Robinson et al. | ......... 405/81 |
| 5,385,428 A | 1/1995 | Taft, 3rd et al. | |
| 5,520,824 A | * 5/1996 | Sasaki | ......... 210/780 |
| 5,987,769 A | * 11/1999 | Ackerman et al. | ......... 210/261 X |
| 6,009,762 A | * 1/2000 | Ockleston | ......... 73/861.74 |
| 6,132,626 A | * 10/2000 | Hart | ......... 210/162 X |

FOREIGN PATENT DOCUMENTS

| | | | |
|---|---|---|---|
| EP | 565793 | * 10/1993 | ......... 119/219 |
| GB | 2241857 | * 9/1991 | ......... 119/219 |

\* cited by examiner

*Primary Examiner*—Jong-Suk (James) Lee
(74) *Attorney, Agent, or Firm*—Steven J. Adamson

(57) ABSTRACT

An apparatus for separating animated objects such as fish or other objects between a non-diverted and diverted fluid stream. Embodiments may include a screen or similar selective pass through device that is arranged in a manner that is generally horizontal (more horizontal than vertical). The non-diverted flow preferably passes over the screen while the diverted flow passes through the screen. Aspects of the apparatus may include faster sweeping velocity than pass through velocity, tapered side or bottom walls, a depressed low flow channel, a distributed under screen reservoir that facilitates distributed fluid flow through the screen or like device and various downstream flow control devices or configurations, amongst other aspects.

34 Claims, 3 Drawing Sheets

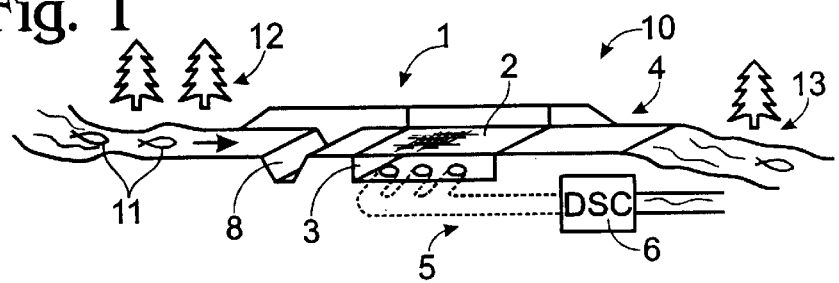
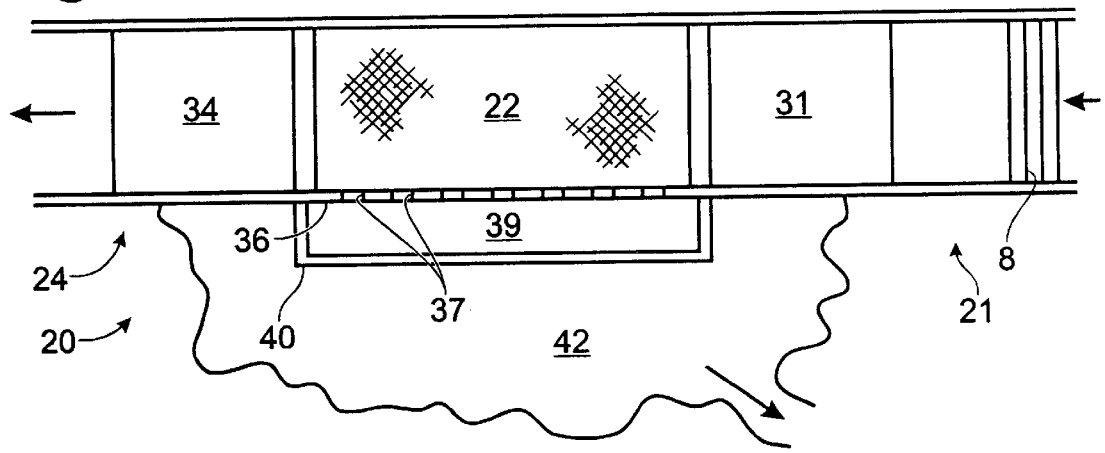
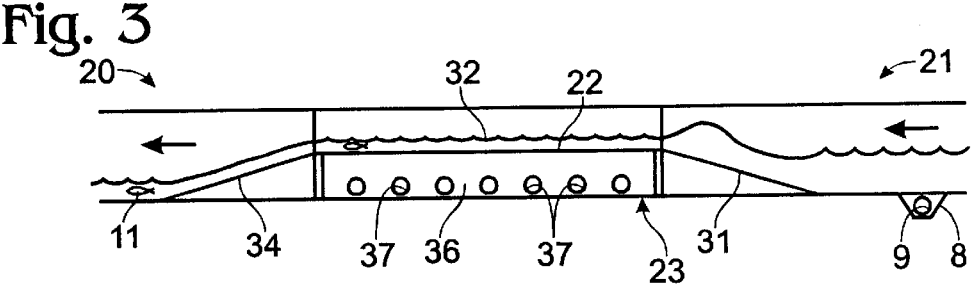
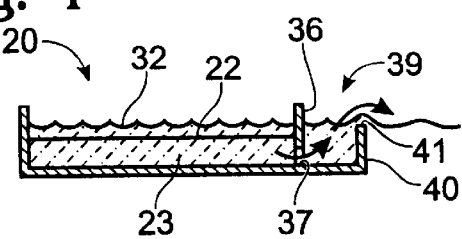
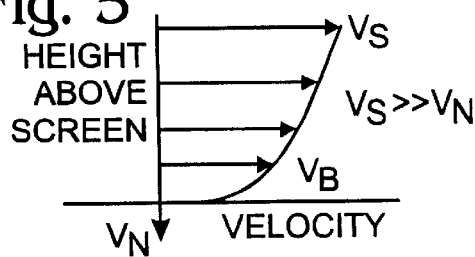

FISH SAFE SCREENED WATER DIVERSION APPARATUS

FIELD OF THE INVENTION

The present invention relates to screened water diversions and, more specifically, to screened water diversions that are relatively maintenance free and efficaciously pass fish, particularly anadromous salmonids. While particularly well suited for fish, the screened diversion of the present invention is capable of separating any suitable mass between two output fluid flows.

BACKGROUND OF THE INVENTION

The diversion of water from streams and rivers has been an integral part of the development of the industrial and agricultural economy of the Pacific Northwest and other regions. The diverted water has been used to generate hydropower to irrigate arid lands, for municipal water supplies and for industrial purposes, etc. Typically, the diversions are not screened, resulting in the ready movement of fish from the river into the diverted water flow and ultimately to their death. In the Pacific Northwest, unscreened water diversions, amongst other causes, have resulted in the extinction of steelhead and salmon from over 50% of their historic range and have critically reduced salmon populations in the rivers that salmon still inhabit. As a result, several species of Pacific Northwest salmon have gone extinct and several others are now listed as threatened or endangered.

During the development of irrigation and hydroelectric facilities, efforts have been made to achieve screened water diversion apparatuses that separate fish and/or debris from the diverted water flow. Generally speaking, these devices have not worked well and for that reason they are rarely used even though required by law in some instances. For example, in its 1996 study of Pacific Northwest salmon, the National Research Council reported that fewer than 1,000 of the 55,000 water diversions in Oregon alone were screened, and 3,240 were listed as a high priority for screening.

Representative fish screen embodiments are shown in U.S. Pat. Nos. 3,938,340 and 4,064,048, issued to Downs and U.S. Pat. No. 4,740,105, issued to Wollander. A common feature of these devices is that the fish screens are arranged substantially vertically. A significant problem with vertically arranged screens is that they are easily fouled or clogged, resulting in burdensome cleaning schedules or elaborate cleaning equipment that is of questionable efficacy (see, for example, the '105 patent).

Other screen arrangements are discussed in U.S. Pat. Nos. 4,526,494 and 5,385,428 issued to Eicher and Taft, respectively. These arrangements each employ a submerged diagonally disposed screen that slopes upwardly in the downstream direction. The diagonal screen promotes rapid movement of water through the screen and in principal generates a shear force that pushes smolt up the screen to a bypass mechanism. The rapid movement of water through the screen, however, causes debris and fish (particularly salmon smolt) to be driven into or accumulated at the screen, thus leading to fouling and fish loss. The screens of both the '494 and '428 patents are pivotally mounted for flushing this debris off the screens. In practice, the screens have also required additional cleaning and maintenance.

It should also be recognized that the devices of the '494 and '428 patents are for major hydroelectric installations which tend often to pass relatively high flow volumes and are much better capitalized than agricultural irrigation districts and the like. The devices of the '494 and '428 patents tend to be prohibitively expensive for low profit margin and non tax or rate payer supported installations such as agricultural fields and rural residential uses, etc.

It should also be recognized that the above-described screened water diversions do not approximate natural conditions, and thus they increase both physical stress on fish and fish mortality. For example, the '340 and '048 patents use a mechanical scoop that collects fish and drops them into a return conduit, while the '105 patent uses fish traps and a tubal transport system. Similarly, the '494 and '428 patents teach submerged conduits that use high velocity water flow through a tilted screen to shear fish off towards a bypass conduit. These are all unnatural stream features and work against advantageous natural flow dynamics.

A need thus exists for a screened water diversion that safely and efficaciously maintains fish in the non-diverted flow. A need also exists for such a screen diversion that approximates natural conditions, is substantially non-fouling and is low cost to implement and maintain. It should be recognized that such a screened water or fluid diversion, while suitable for fish passage, may also be used for other purposes.

SUMMARY OF THE INVENTION

Accordingly, it is an object of the present invention to provide a screened water diversion that creates a hydraulic grade line elevated over at least a portion of a diversion screen to thereby inhibit the entrance of fish or debris into the screen. This is preferably achieved by hydraulically limiting the rate of flow through the screen.

It is another object of the present invention to provide a screened water diversion that has a screen disposed substantially in parallel with a non-diverted fluid flow and is configured to create a substantially even, non-diverted fluid flow over that screen.

It is another object of the present invention to provide a screened water diversion that has a substantially horizontally disposed screen and achieves a distributed and relatively uniform flow of fluid through that screen, thereby reducing or eliminating "hot spots" on the screen where flow levels are relatively high and likely to impinge fish and/or debris.

It is a further object of the present invention to provide a screened water diversion that is low cost, passive (no or few moving parts, depending on embodiment) and substantially non-fouling (far greater intervals between cleanings than prior art diversion devices).

And it is also an object of the present invention to provide a screened water diversion that approximates a naturally occurring stream feature such as a gentle riffle, etc.

These and related objects of the present invention are achieved by use of a fish safe screened water diversion apparatus as described herein.

The attainment of the foregoing and related advantages and features of the invention should be more readily apparent to those skilled in the art, after review of the following more detailed description of the invention taken together with the drawings.

BRIEF DESCRIPTION OF THE DRAWINGS

FIG. 1 is a diagram of a screened water or fluid diversion in accordance with the present invention.

FIGS. 2–4 are a plan view, a side view and a cross-sectional end view of one embodiment of a screened water diversion in accordance with the present invention.

FIG. 5 is a velocity profile illustrating a relationship of velocity components of interest.

DETAILED DESCRIPTION

Figure 6:
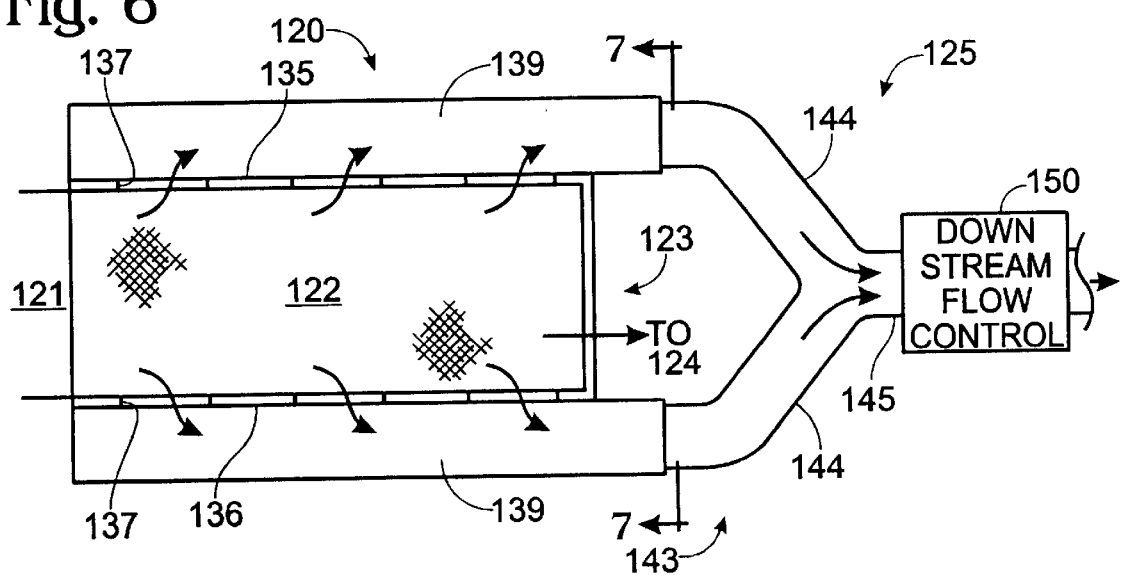
FIGS. 6–7 are a plan view and end view of another embodiment of a screen water diversion in accordance with the present invention.

Referring to FIG. 1, a diagram of a screened water or fluid diversion 10 in accordance with the present invention is shown. The screened diversion 10 has several parts including: an input or inlet transition section 1, a screen 2, a below screen reservoir or uniform flow transition chamber (UFTC) 3, a non-diverted output 4 and a diverted output 5. The input may contain a sediment trap 8 (which is known in the art) and the diverted output preferably includes some type of downstream flow control 6 (to maintain the screen is a sufficiently submerged manner that fish can pass over the screen). Portions of the diverted output are shown in phantom lines in FIG. 1 because the diverted output may be configured with a catchment pond (FIGS. 2–4) or an output conduit (FIGS. 6–7) or any of several other suitable configurations.

In the embodiment of FIG. 1, the screened diversion 10 is located between an upstream flow 12 and a downstream flow 13. The screened diversion is designed to pass fish 11 of different sizes over the screen and to allow diverted water to be withdrawn from under the screen, all in a manner that does not trap or damage fish passing over the screen. The text that follows includes a few representative embodiments, followed by more specific design considerations for various components of the screen diversion.

Referring to FIGS. 2–4, a plan view, a side view and a cross-sectional end view of one embodiment of a screened water diversion apparatus or device 20 in accordance with the present invention are respectively shown. In this embodiment, items 1–5 of FIG. 1 are analogous to items 21–25. In the embodiment of FIGS. 2–3, flow is from right to left. The sediment trap 8 with output conduit 9 precedes input 21 which may include a sloped ramp 31. If a sloped ramp is provided, a flat section is preferably provide before the screen to smooth out turbulence induced by the ramp. A ramp may or may not be necessary based on conditions at the installation site and related hydrological considerations.

Flow next enters the screen and below screen reservoir regions 22,23. Line 32 indicates the height of fluid flow throughout the diversion and non-diverted output. It can be seen that ramp 31 causes a rise in fluid that is then dissipated across the screen. At the non-diverted output 24, exit ramp 34 causes flow to descend, effectively pulling flow off of the end portion of screen 22. Use of ramp 34 is optional (for example, a down ramp is not shown in the embodiment of FIG. 1).

From FIGS. 2–4, it can be seen that the illustrated embodiment has a rectangular reservoir or uniform flow transition chamber (UFTC) 23. One sidewall 36 of the reservoir, includes a plurality of circular openings 37 through which diverted flow passes out of the UFTC (the outer wall of weir 40 is not shown is FIG. 3 to better show these holes). Holes 37 are preferably distributed along wall 37 so the movement of fluid through screen 22 is more evenly distributed. While a plurality of holes is shown, it should be recognized that one large whole or a few larger holes will suffice. Fluid exiting holes 37 preferably flows into a stilling basin or attenuation chamber 39. The stilling basin or attenuation chamber 39 allows secondary stilling of the diverted water and absorbs the pressure gradient induced by the accelerated flow of water through holes 37. A weir 40 is preferably provided to define the stilling basin and the height of weir 40 is preferably both adjustable (with slats 41 or otherwise) and set at a height that establishes the hydraulic grade line (e.g. minimum water level) over the screen (see FIG. 4). Discharge over weir 40 or through slots within the weir (not shown, but known) preferably enters a catchment holding pond 42 (or an output conduit, for example, as shown in FIG. 1).

Operation

Operation of device 20 (and other devices herein) is generally as follows. Water flowing through the device develops the following three velocity components:

sweeping velocity ($V_S$) which is the average velocity of water moving directly across the screen from input to the non-diverted output;

boundary layer velocity ($V_B$) which is the velocity of water in the non-diverted flow at or very near the screen (as opposed to $V_S$ which is the velocity of water above water travelling at $V_B$;

normal velocity ($V_N$) which is the velocity of water passing through the screen;

When sufficient inflow is available to submerge the UFTC and screen, an elevated grade line is achieved and device 20 is operational. Water entering the device either sweeps across the screen at $V_S$ (substantially unaffected by the hydraulic condition at the screen) or becomes part of the near screen hydraulic condition. Water in the near screen hydraulic condition is diverted between a slower moving boundary layer component, $V_B$, and a component that passes through the screen at $V_N$. This latter flow is the diverted water flow. FIG. 5 illustrates a representative velocity profile of water moving across and through the screen, indicating the $V_S$, $V_B$ and $V_N$ components. Water travelling at $V_S$ preferably achieves a relatively smooth, even fluid flow over water closer to the screen and thus is capable of moving fish and other objects over the screen.

Water passing through the screen preferably has a relatively uniform velocity across a large portion of the screen. The reasons for this are many and include that if flow is relatively high through one or more specific areas of the screen (termed "hot spots"):

a. the elevated hydraulic grade line is disrupted in those areas;

b. disruption of the elevated hydraulic grade line results in loss of the even fluid flow that is preferred to transport fish and debris over the screen;

c. debris is likely to get pinned to the screen in those areas;

d. small fish are more likely to get pinned to the screen in those areas; and e. collection of debris due to "hot spots" creates new and more intense hot spots, increasing items a–d above and ultimately compromising screen function.

Thus, the geometry of the screen, the UFTC and downstream elements of the screened diversion are important in permitting water to flow through the screen in a distributed manner and in reducing the occurrence of hot spots. FIGS.

2–4 illustrate only one embodiment for facilitating distributed and substantially uniform flow through the screen. Other embodiments, some of which are discussed below, may also achieve this type of flow.

Making screen 22 "large" reduces the relative rate of distributed flow through the screen which in turn permits $V_S$ to be much greater than $V_N$ ($V_S$>>$V_N$) and reduces the likelihood of trapping debris or pinning fish on the screen. In a preferred embodiment, $V_S$ is five or ten times or more greater than $V_N$.

While a rectangular UFTC and a weir for water-level control are shown in FIGS. 2–4, it should be recognized that other configurations may be used without departing from the scope and spirit of the present invention. In general, it is desirable to achieve flows across the screen that have a generally uniform velocity to readily sweep fish across the screen. It is nonetheless acceptable in most instances if the water/fluid flow velocity increases or does not decrease too rapidly across the screen. Site specific adjustments in design and operation may be required to optimize system performance over a range of flow levels and site conditions.

Figure 7:
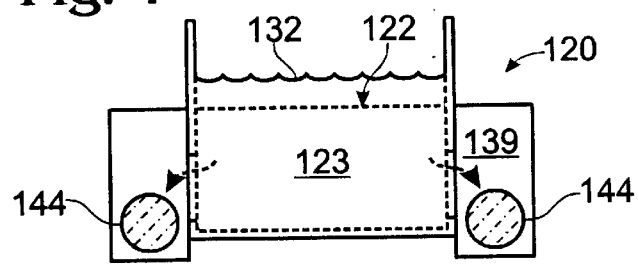

Referring to FIGS. 6–7, a plan view and end view of another embodiment of a screen water diversion 120 in accordance with the present invention are respectively shown. Device 120 has an input 121, a screen 122, a UFTC 123, a non-diverted output 124 and a diverted output 125 (with attenuation chambers 139) each similar at least in principle to their corresponding components in FIGS. 1–4. Amongst other features, the embodiments of FIGS. 6–7 illustrate the provision of (output flow holes 137 in both of the sidewalls 135, 136 and an output conduit 143 as opposed to an adjacent catchment pond. The provision of diverted flow holes 137 on both sides of the UFTC facilitates a more even distribution of flow through screen 122, thus promoting flow through the screen over a larger surface area thereof and at a reduced velocity.

The attenuation chambers 139, which receive the diverted flow and functions substantially as described above, are coupled to output conduit 143. The output conduit in FIG. 6 is shown as having two branches 144 that converge into a main diverted output 145, but the conduit structure need not necessarily converge into a single main output.

A block representative of downstream flow control (DSFC) 150 is coupled to main output 145. The purpose of the downstream flow control is to maintain the fluid grade line 132 over screen 122 at least at a minimum desired level.

Figure 8A:
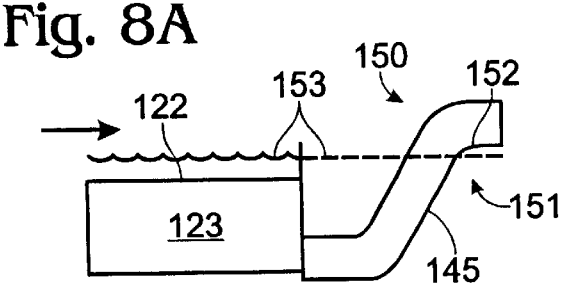
FIGS. 8A–8B illustrate embodiments of downstream flow control in accordance with the present invention.
Figure 8B:
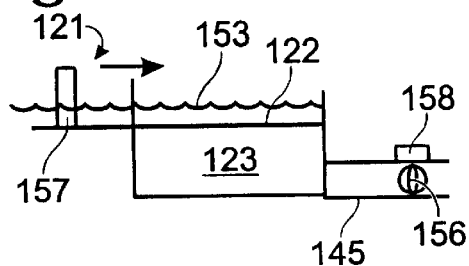

Referring to FIGS. 8A–8B, this may be achieved by configuring the main output conduit 145 so have a section 151 that rises above the elevation of the screen. The bottom 152 of this raised section establishes, more or less, the minimum grade line 153 over screen 122. This is shown in FIG. 8A.

In FIG. 8B, the DSFC 150 is configured as a valve 156 or similar flow restriction device (such as a turbine, etc.). The valve 156 can be adjusted based on input flow to maintain a desired grade line 153. The valve may be manually controlled or electronically controlled with a sensor 157 that measures input flow and control logic 158 that adjust the valve accordingly. Note that the output conduit 143–145 could also empty into a catchment pond defined at least in part by a weir and the height of the weir can provide the elevated grade line establishing function.

It should be recognized that in the embodiments of FIGS. 1–4 and 6–7, the screen 2, 22 or 122 may be disposed in a substantially horizontal manner. More specifically, the screen is preferably disposed nearly horizontal or from approximately 0 to 5 or 10 degrees below, or in less preferred embodiments, from a few degrees above to several degrees below (e.g. 5 degrees above to 20 degrees below). It should also be recognized, however, that the teachings of the present invention ($V_S$>>$V_N$, etc.) may also be achieved with screens disposed at greater angles depending on incoming flow, site conditions and the configuration of the UFTC and downstream flow control.

Figure 9A:
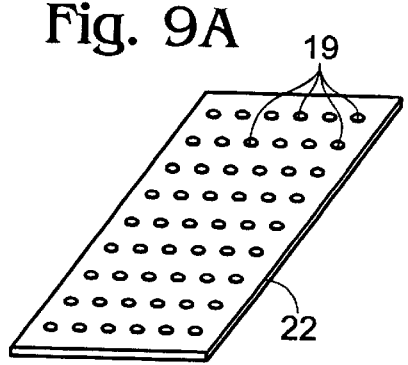
FIGS. 9A–9C illustrate a plurality of embodiments of a screen for use in a screened diversion apparatus in accordance with the present invention are shown.
Figure 9B:
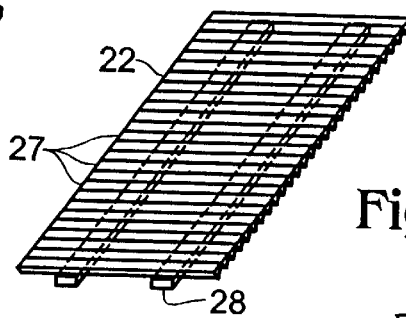
Figure 9C:
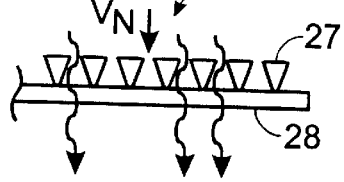

Referring to FIGS. 9A–9C, a plurality of embodiments of a screen for use in a screened diversion apparatus in accordance with the present invention are shown. FIG. 9A illustrates a screen 22 (which could be any screen herein) that is implemented with a perforated plate having a plurality of openings 19. Such a screen can be fabricated of stainless steel, for example, and have drilled or otherwise formed openings, though the screen may also be made of materials other than stainless steel. One or both surfaces of the screen may be coated, polished, or otherwise treated to enhance $V_N$ or the $V_S$:$V_N$ ratio. The openings in the screen may have any size or shape. The arrangement of openings in the screen may also vary in density or pattern in any direction across the screen, and the size of the openings may vary. For example, the openings could be smaller or less frequent in areas that are more likely to be hot spots.

FIGS. 9B–9C illustrate screen 22 embodied as a wedge wire screen. Wedge wire screens typically consist of a plurality of parallelly arranged wedge shaped wires or members (shown in cross-section in FIG. 9C). The wedge shaped wires 27 are typically supported by some type of frame or support member 28. Arrows A indicate the direction of diverted water flow through the screen 22. The wedge arrangements may be advantageous in a screened water diversion in that they may produce small back eddies that reduce $V_N$ and permit $V_S$ to be greater than $V_N$.

It should also be recognized that the screen may be formed with a sufficiently strong and supported wire mesh or the like.

Figure 10A:
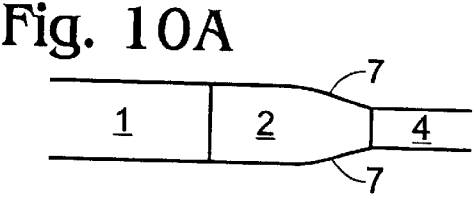
FIGS. 10A–10C through 12A–12B illustrate additional inventive aspects of a screened diversion in accordance with the present invention.
Figure 10B:
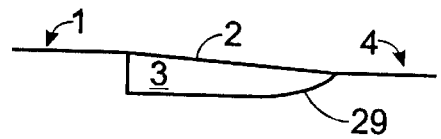
Figure 10C:
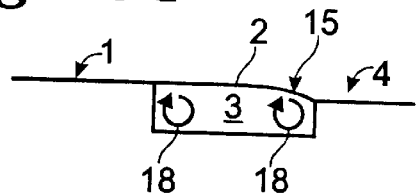

Referring to FIGS. 10A–10C, additional inventive aspects of a screened diversion in accordance with the present invention are shown. FIG. 10A is a top view of a screened diversion with the input 1, screen 2 and non-diverted output 4 shown, generally as discussed above. As fluid flows into the device and through the diverted output, for a rectangular reservoir, for example, as shown in FIGS. 2–4 and 6–7, the width and height of the flow across the screen decreases (due to the flow out the diverted output) which may cause the flow velocity above the screen to slow down. Tapered wall sections 7 accommodate for the loss of diverted flow and help to maintain flow across the screen at a more uniform velocity. Note that the tapered sections may be straight or curved, and gradual tapers are preferred to minimize turbulence. Smooth (Teflon-like) coatings may be used on the tapered walls to further reduce turbulence.

FIG. 10B is a cross-sectional side view of a screened diversion and shows a tapered floor section 29 formed on the bottom of the UFTC 3. Tapered section 29 serves a purpose similar to tapered sections 7, reducing volume to accommodate for diverted flow, though the embodiment of FIG. 10B may be provided with or without additional tapered wall section(s) 7.

FIG. 10C illustrates a cross-sectional side view of a screened diversion in accordance with the present invention. In the embodiment of FIG. 10C, screen 2 includes a curved section 15 that slopes downward. The curved downward slope permits gravity to "pull" water on screen 2 down towards the non-diverted output 4, helping to prevent or reduce a slowdown in $V_S$ across the screen as flow is diverted. The rate of curvature of the screen of FIG. 10C may increase towards the non-diverted output. Circular arrows 18 indicate eddy currents that may occur in a rectangular UFTC. Since the arrowheads point in the downstream direction, maintenance of appropriate $V_B$ and $V_S$ is facilitated.

Figure 11:
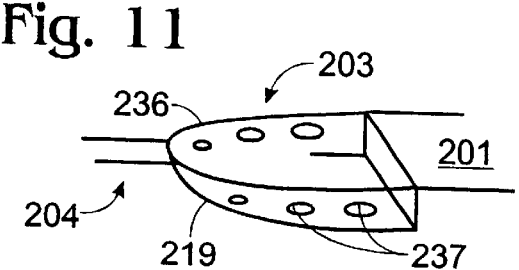

FIG. 11 illustrates a representative embodiment of a form molded UFTC 203. While the UFTC may often be formed of poured concrete at a site installation, for smaller diversions or where otherwise appropriate a pre-formed UFTC may be used. FIG. 11 generally indicates an input 201 and a non-diverted output 204. The screen is not shown for clarity, but would fit over the UFTC. Other features illustrated in FIG. 11 include a curved taper of the sidewalls 236 (non-diverted output 204 is narrower than input 201), diverted flow holes 237 that vary in size along the UFTC sides/bottom (this may be beneficial in more evenly distributing flow through the screen), and an up tapering UFTC bottom section 219.

Figure 12A:
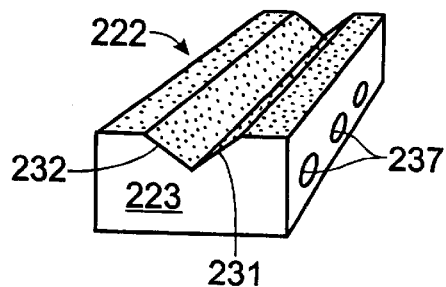
Figure 12B:
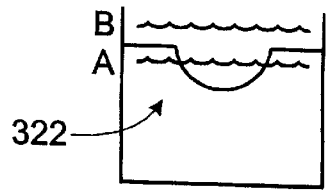

Referring to FIGS. 12A–12B, a couple alternative embodiments of screen 2, 22, or 122 in accordance with the present invention are shown. FIG. 12A illustrates a perspective view of a screen 222 disposed in or near the horizontal plain (as discussed above), but having diagonal sidewalls 231,232. A similar curved version 322 is shown in a cross-sectional end view in FIG. 12B. These screen embodiments would help channel fish or other debris for passage at low flows. They would also increase the surface area for diverted flow through the screen, which may be beneficial, particularly when the ratio of diverted flow to non-diverted flow is large. Note that FIG. 12A also illustrates a UFTC 223 and diverted output holes 237. FIG. 12B illustrates flow levels A and B, level A indicating a low flow level where the channeling effect is more recognizable.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. An apparatus for separating animated objects in a fluid stream, comprising:
   an input;
   a non-diverted output;
   a diverted output;
   a screen that is generally disposed in a manner that is substantially more horizontal than vertical provided between said input and said diverted output;
   a reservoir provided at least in part under said screen; and
   downstream flow control that functions to maintain the height of a fluid flowing through said apparatus at a given level relative to said screen;
   wherein fluid movement through said apparatus from said input to said non-diverted output is substantially unimpeded, thereby facilitating movement of fish from said input to said non-diverted output.

2. The apparatus of claim 1, wherein said screen is disposed such that relative to the input, the height of the screen proximate said non-diverted output is within a range of 10 degrees in angle from horizontal above the input to 30 degrees from horizontal below the input.

3. The apparatus of claim 1, wherein said screen is disposed such that relative to the input, the height of the screen proximate said non-diverted output is within a range of 5 degrees in angle from horizontal above the input to 20 degrees from horizontal below the input.

4. The apparatus of claim 1, wherein said screen is disposed such that relative to the input, the height of the screen proximate said non-diverted output is within a range of 0 degrees in angle from horizontal above the input to 10 degrees from horizontal below the input.

5. The apparatus of claim 1, wherein the surface area of said screen for pass through to said diverted output is tapered towards the non-diverted output.

6. The apparatus of claim 1, wherein said screen includes a region that is depressed below other portions of said screen such that at low flow levels fluid propagates through said depressed region from said input to said non-diverted output.

7. The apparatus of claim 6, wherein said depressed region includes side walls that in lateral cross section are at least one of the following:
   generally V-shaped;
   generally U-shaped; and
   contain vertical portions.

8. The apparatus of claim 1, wherein the downstream flow control includes a dam or weir.

9. The apparatus of claim 1, wherein said downstream flow control includes at least one of:
   a valve that controls flow through said diverted output;
   an output conduit section that is positioned at an appropriately elevated level relative to the screen so as to regulate the level of flow at the screen; and
   a catch basin.

10. The apparatus of claim 9, further comprising a sensor that senses fluid flows into the apparatus and a mechanism coupled to the sensor and the valve that causes the valve position to be adjusted based on sensed input flows to achieve a desired level of flow at the screen.

11. The apparatus of claim 1, wherein said reservoir is defined by walls and at least one of said walls includes a distributed portal for passage of fluid from said reservoir towards said diverted output, said distributed portal serving to facilitate a distributed flow through said screen.

12. The apparatus of claim 1, wherein said reservoir is defined at least in part by walls and a bottom and at least one of the walls or bottom are tapered to reduced reservoir volume towards the downstream portion of the reservoir.

13. The apparatus of claim 1, wherein said screen curves downward at a downstream portion thereof.

14. The apparatus of claim 1, wherein said input is provided above said screen such that fluid flows generally downward through said screen to said diverted output.

15. An apparatus for separating animated objects in a fluid stream, comprising:
   an input, a diverted output and a non-diverted output;
   a screen disposed in a generally horizontal manner and that is provided at the input and positioned to separate animated objects from between non-diverted and diverted fluid flows;
   a reservoir provided at least in part under said screen; and
   downstream flow control that functions to maintain the height of a fluid flowing through said apparatus at a given level relative to said screen;
   wherein fluid flows generally downward through said screen to said diverted output.

16. The apparatus of claim 15, wherein said screen is disposed such that relative to the input, the height of the screen proximate said non-diverted output is within a range of 5 degrees in angle from horizontal above the input to 25 degrees from horizontal below the input.

17. The apparatus of claim 15, wherein the surface area of said screen for pass through to said diverted output is tapered towards the non-diverted output.

18. The apparatus of claim 15, wherein the reservoir is defined by a bottom and side walls and at least one of said bottom and side walls is tapered in a manner that reduces the lateral cross-sectional surface area of the reservoir towards the non-diverted output.

19. The apparatus of claim 15, wherein said screen includes a region that is depressed below other portions of said screen such that at low flow levels fluid propagates through said depressed region from said input to said non-diverted output.

20. The apparatus of claim 15, wherein fluid movement through said apparatus from said input to said non-diverted output is substantially unimpeded, thereby facilitating movement of fish from said input to said non-diverted output.

21. The apparatus of claim 15, wherein said reservoir is defined by walls and at least one of said walls includes a distributed portal structure for passage of fluid from said reservoir towards said diverted output, said distributed portal structure serving to facilitate a distributed fluid flow through said screen.

22. The apparatus of claim 15, wherein said apparatus is configured to move a surface fluid flow across said screen to the non-diverted output at a velocity that is greater than the velocity of an average fluid flow through said screen to said diverted output.

23. The apparatus of claim 15, wherein fluid movement through said apparatus from said input to said non-diverted output is substantially unimpeded, thereby facilitating movement of fish from said input to said non-diverted output.

24. An apparatus for use in separating animated objects between fluid streams, comprising:

an input, a diverted output and a non-diverted output;

a screen generally disposed in a manner that is substantially more horizontal than vertical and that is provided at said input and positioned to separate animated objects between non-diverted and diverted fluid flows;

a reservoir formed at least in part under said screen and coupled to said diverted output; and downstream flow control that functions to maintain the height of a fluid flowing through said apparatus at a given level relative to said screen;

wherein said apparatus is configured to move a surface fluid flow across said screen to the non-diverted output at a velocity that is greater than the velocity of an average fluid flow through said screen to said diverted output.

25. The apparatus of claim 24, wherein said screen is disposed such that relative to the input, the height of the screen proximate said non-diverted output is within a range of 5 degrees in angle from horizontal above the input to 25 degrees from horizontal below the input.

26. The apparatus of claim 24, wherein the effective surface area of said screen for pass through to said diverted output is tapered towards the non-diverted output.

27. The apparatus of claim 24, wherein the reservoir is defined by a bottom and side walls and at least one of said bottom and side walls is tapered in a manner that reduces the lateral cross-sectional surface area of the reservoir towards the non-diverted output.

28. The apparatus of claim 24, wherein said screen includes a region that is depressed below other portions of said screen such that at low flow levels fluid propagates through said depressed region from said input to said non-diverted output.

29. The apparatus of claim 24, wherein said reservoir is defined by walls and at least one of said walls includes a distributed portal structure for passage of fluid from said reservoir towards said diverted output, said distributed portal structure serving to facilitate a distributed fluid flow through said screen.

30. An apparatus for use in separating animated objects between fluid streams, comprising:

an input, a diverted output and a non-diverted output;

a screen generally disposed in a manner that is substantially more horizontal than vertical and that is provided at said input and positioned to separate animated objects between non-diverted and diverted fluid flows; and a reservoir provided at least in part under said screen that is defined by a bottom and side walls and has a distributed portal structure that facilitates distributed flow of fluid through the screen; and wherein at least one of said bottom and side walls is tapered in a manner that reduces the lateral cross-sectional surface area of the reservoir towards the non-diverted output.

31. The apparatus of claim 30, wherein said screen is disposed such that relative to the input, the height of the screen proximate said non-diverted output is within a range of 5 degrees in angle from horizontal above the input to 25 degrees from horizontal below the input.

32. The apparatus of claim 30, wherein the surface area of said screen for pass through to said diverted output is tapered towards the non-diverted output.

33. The apparatus of claim 30 wherein said screen includes a region that is depressed below other portions of said screen such that at low flow levels fluid propagates through said depressed region from said input to said non-diverted output.

34. The apparatus of claim 30, further comprising downstream flow control (DSFC) that functions to maintain the height of a fluid flowing through said apparatus at a given level relative to said screen.

* * * * *